(12) United States Patent
McClory et al.

(10) Patent No.: US 11,862,831 B2
(45) Date of Patent: Jan. 2, 2024

(54) CONTAINER FOR A FUEL CELL SYSTEM

(71) Applicant: Toyota Motor Engineering & Manufacturing North America, Inc., Plano, TX (US)

(72) Inventors: Matthew K. McClory, Aliso Viejo, CA (US); Daniel Charles Folick, Long Beach, CA (US); Dakota Kelley, Garland, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 46 days.

(21) Appl. No.: 17/563,269

(22) Filed: Dec. 28, 2021

(65) Prior Publication Data

US 2023/0207853 A1 Jun. 29, 2023

(51) Int. Cl.
*H01M 8/2465* (2016.01)
*H01M 8/04029* (2016.01)
*H01M 8/04014* (2016.01)

(52) U.S. Cl.
CPC ..... *H01M 8/2465* (2013.01); *H01M 8/04014* (2013.01); *H01M 8/04029* (2013.01)

(58) Field of Classification Search
CPC .................................................. H01M 8/2465
See application file for complete search history.

(56) References Cited

U.S. PATENT DOCUMENTS

| 5,741,605 | A | 4/1998 | Gillett et al. |
| 9,496,571 | B2 | 11/2016 | Foster et al. |
| 10,424,807 | B2 | 9/2019 | Yu et al. |
| 10,714,783 | B2 | 7/2020 | Hickey et al. |
| 2007/0042248 | A1 | 2/2007 | Kim et al. |
| 2009/0246577 | A1 | 10/2009 | Craft, Jr. et al. |
| 2009/0269636 | A1 | 10/2009 | Craft, Jr. et al. |

(Continued)

FOREIGN PATENT DOCUMENTS

| CN | 113871656 A | * 12/2021 |
| WO | 2013037031 A1 | 3/2013 |

OTHER PUBLICATIONS

Bozzolo, M. et al., "Moving Towards Climate Neutrality—Fuel Cell Technology for Future Energy and Propulsion Systems", MTU Solutions, Retrieved from https://www.mtu-solutions.com/na/en/technical-articles/2020/moving-towards-climate-neutrality-fuel-cell-technology-for-future-energy-and-propulsion-systems.html, Nov. 18, 2020 (11 pages).

(Continued)

*Primary Examiner* — Brian R Ohara
(74) *Attorney, Agent, or Firm* — Christopher G. Darrow; Darrow Mustafa PC

(57) ABSTRACT

A container for a fuel cell system includes a system frame configured to house one or more components of a fuel cell system. The container also includes a plurality of fuel cells supported by the system frame and configured to provide power to an external unit. The container also includes a raised floor configured to support the plurality of fuel cells. The container also includes a cooling system. The cooling system includes a central cooling pipe located underneath the raised floor, a plurality of fuel cell cooling pipes connected to the central cooling pipe and to each fuel cell, and a cooling pipe valve configured to regulate the pressure of the cooling system.

20 Claims, 7 Drawing Sheets

(56) References Cited

U.S. PATENT DOCUMENTS

| | | | |
|---|---|---|---|
| 2011/0143239 A1* | 6/2011 | Ogawa | H01M 8/2465 |
| | | | 429/423 |
| 2012/0326516 A1 | 12/2012 | Gurunathan et al. | |
| 2013/0280630 A1 | 10/2013 | Marteau et al. | |
| 2018/0331385 A1* | 11/2018 | Hickey | H01M 8/0625 |

OTHER PUBLICATIONS

Wolk, R.H., "Fuel Cells for homes and hospitals," IEEE Spectrum, pp. 45-52 (8 pages).

* cited by examiner

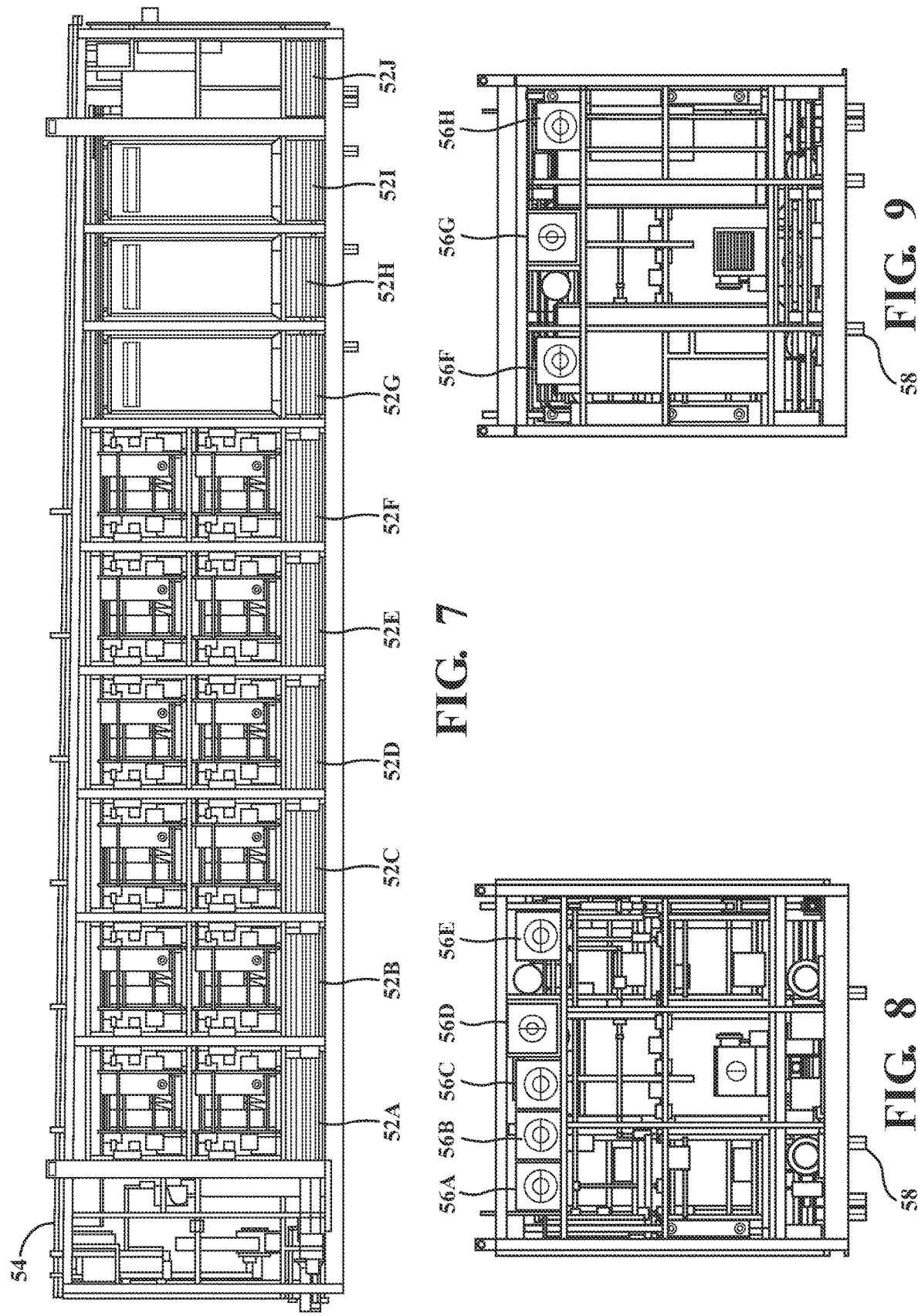

CONTAINER FOR A FUEL CELL SYSTEM

TECHNICAL FIELD

The embodiments disclosed herein relate to a container for a fuel cell system and, more particularly, a container for a fuel cell system configured to supply power to an external unit.

BACKGROUND

Fuel cell systems can supply power to one or more systems external to the fuel cell system. For example, fuel cell systems can be used to power vehicles, buildings, or data centers.

SUMMARY

This section generally summarizes the disclosure and does not comprehensively explain its full scope or all its features.

In one aspect, a container for a fuel cell system includes a system frame configured to house one or more components of a fuel cell system. The container also includes a plurality of fuel cells supported by the system frame and configured to provide power to an external unit. The container also includes a raised floor configured to support the plurality of fuel cells. The container also includes a cooling system. The cooling system includes a central cooling pipe located underneath the raised floor, a plurality of fuel cell cooling pipes connected to the central cooling pipe and to each fuel cell, and a cooling pipe valve configured to regulate the pressure of the cooling system.

In another aspect, a container for a fuel cell system includes a system frame configured to house one or more fuel cell system components. The container also includes a plurality of fuel cells supported by the system frame and configured to provide power to an external unit. The container also includes a raised floor configured to support the plurality of fuel cells and a central aisle configured to allow interior access to the container for maintenance on the components of the fuel cell system. The raised floor provides the floor for the central aisle, defined by a first set of the plurality of fuel cells forming a first row and a second set of the plurality of fuel cells forming a second row. The container also includes a cooling system. The cooling system includes a central cooling pipe located underneath the raised floor, a plurality of fuel cell cooling pipes connected to the central cooling pipe and to each fuel cell, and a cooling pipe valve configured to regulate the pressure of the cooling system. The container also includes a ventilation system including one or more ventilation fans and one or more vents located on the exterior of the container and configured to expel vapor from the container. The container also includes a hydrogen supply system configured to deliver hydrogen fuel to each fuel cell. The hydrogen supply system includes a hydrogen header pipe configured to receive a supply of hydrogen fuel and connected to a plurality of fuel cell hydrogen pipes, each connected to each fuel cell.

In yet another aspect, a container for a fuel cell system includes a system frame configured to house one or more fuel cell system components. The container also includes a housing configured to enclose the fuel cell system and protect the components of the fuel cell system from its external environment. The container also includes a housing frame configured to connect the housing to the system frame.

These and other aspects will be described in additional detail below.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

FIG. 7 illustrates a front view of the container.

FIG. 8 illustrates a side view of the container.

FIG. 9 illustrates a side view of the container opposite of the side view of FIG. 8.

DETAILED DESCRIPTION

Described is a container for a fuel cell system configured to supply power to an external unit. The container includes a system frame configured to house one or more components of a fuel cell system, a plurality of fuel cells supported by the system frame and configured to provide power to an external unit, and a raised floor configured to support the plurality of fuel cells.

Figure 1:
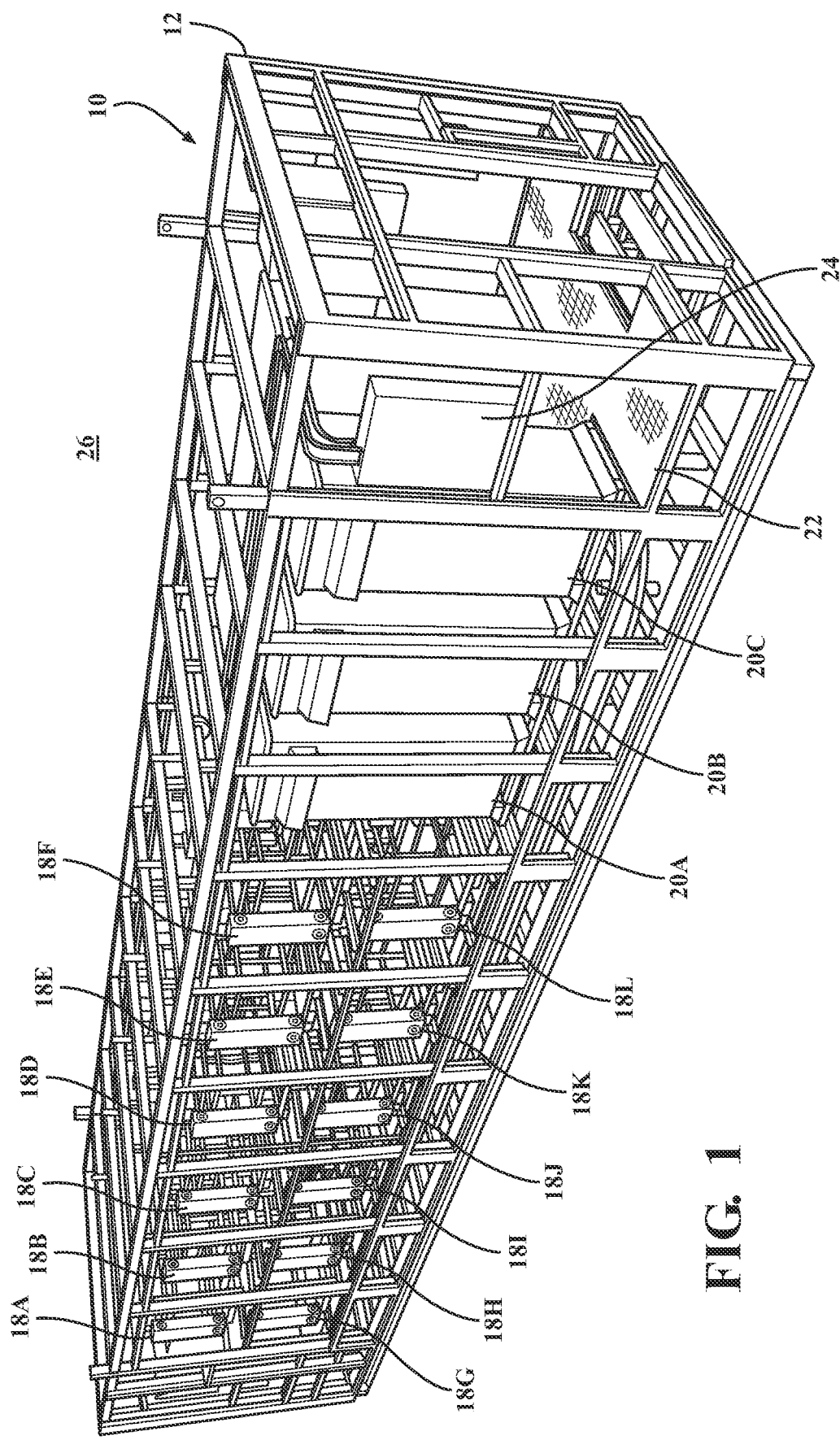
FIG. 1 illustrates one example of a container having a system frame for a fuel cell system.

Referring to FIG. 1, an example of a container 10 for a fuel cell system is shown. The container 10 can be configured to house a fuel cell system, which can provide power to an external unit. The external unit can be a residential or commercial building. However, it should be understood that the external unit can be any type of electricity demanding structure, system, and the like. The external unit can be configured to request power (e.g., make a power request or demand) from the fuel cell system to receive power from the fuel cell system.

Figure 2:
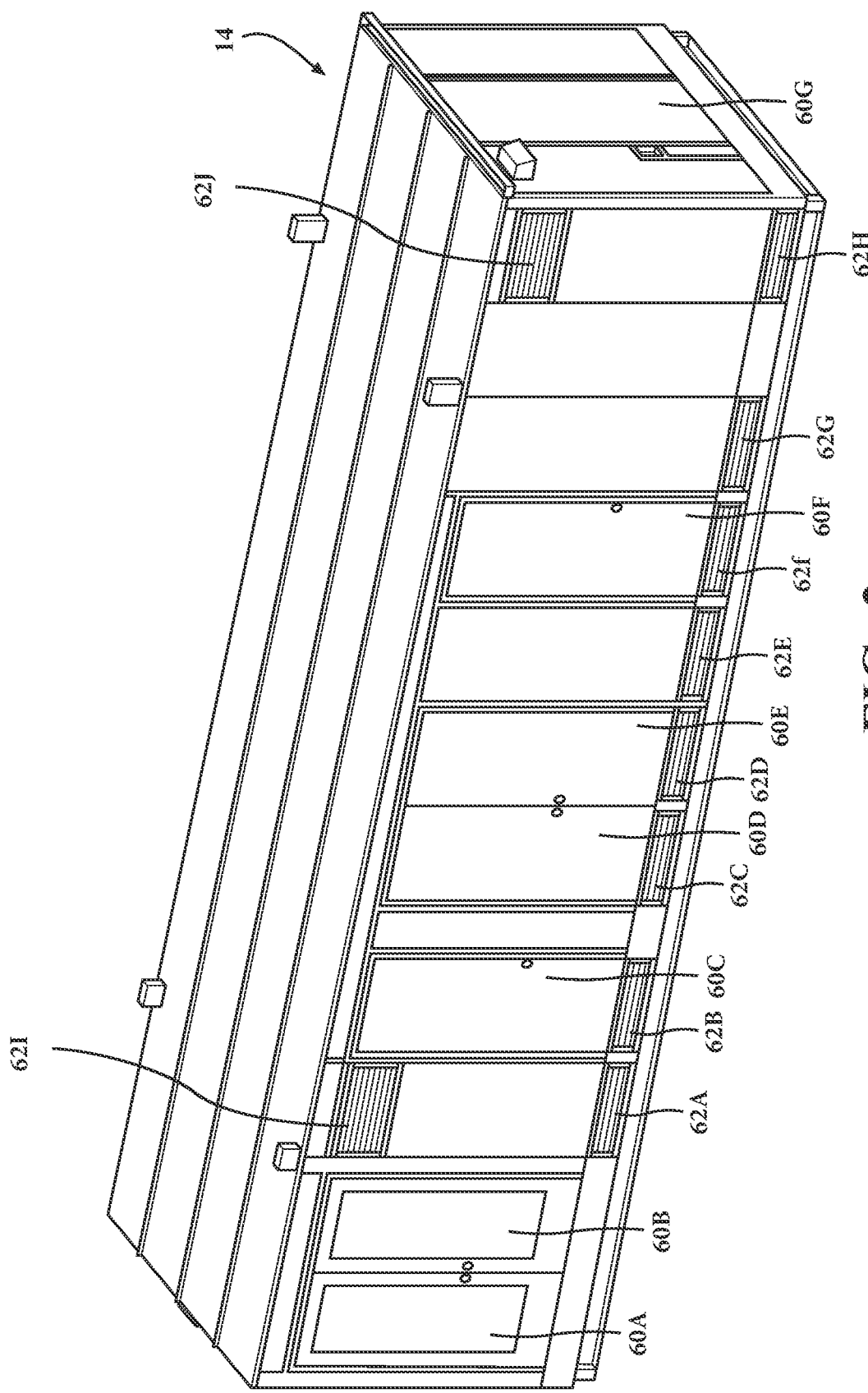
FIG. 2 illustrates one example of a housing for the container.
Figure 3:
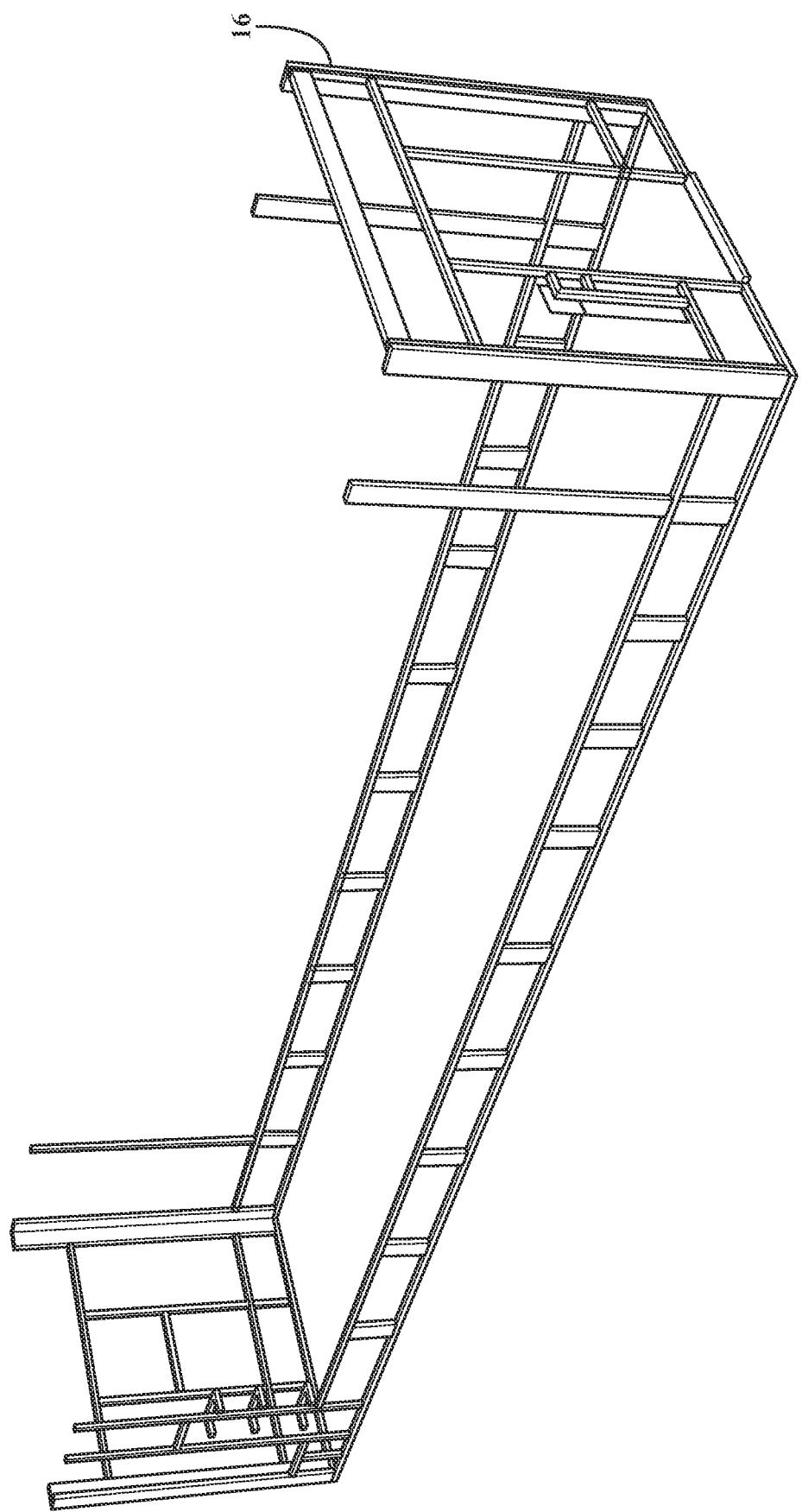
FIG. 3 illustrates one example of a housing frame for connecting the housing to the system frame.

The system frame 12 is configured to house (e.g., support) one or more components of the fuel cell system, for example, a plurality of fuel cell holders 18A-18X (fuel cell holders 18A-18L are shown in FIG. 1), a plurality of DC-DC converters 20A-20F (DC-DC converters 20A-20C are shown in FIG. 1), and a raised floor 22. The system frame 12 can also be configured to support one or more auxiliary load center(s) 24. The auxiliary load center(s) 24 can include one or more components configured to provide power to one or more auxiliary systems of the container 10, as described in further detail below With additional reference to FIGS. 2 and 3, the container 10 includes a system frame 12, a housing 14, and a housing frame 16. The system frame 12 can be mated to the housing frame 16. The housing frame 16 is configured to connect the system frame 12 to the housing 14. The housing can then house (e.g., envelope, enclose, etc.) one or more of the components of the fuel cell system supported or contained within the system frame 12. The housing 14 protects these components from an external environment 26 of the housing.

Figure 10:
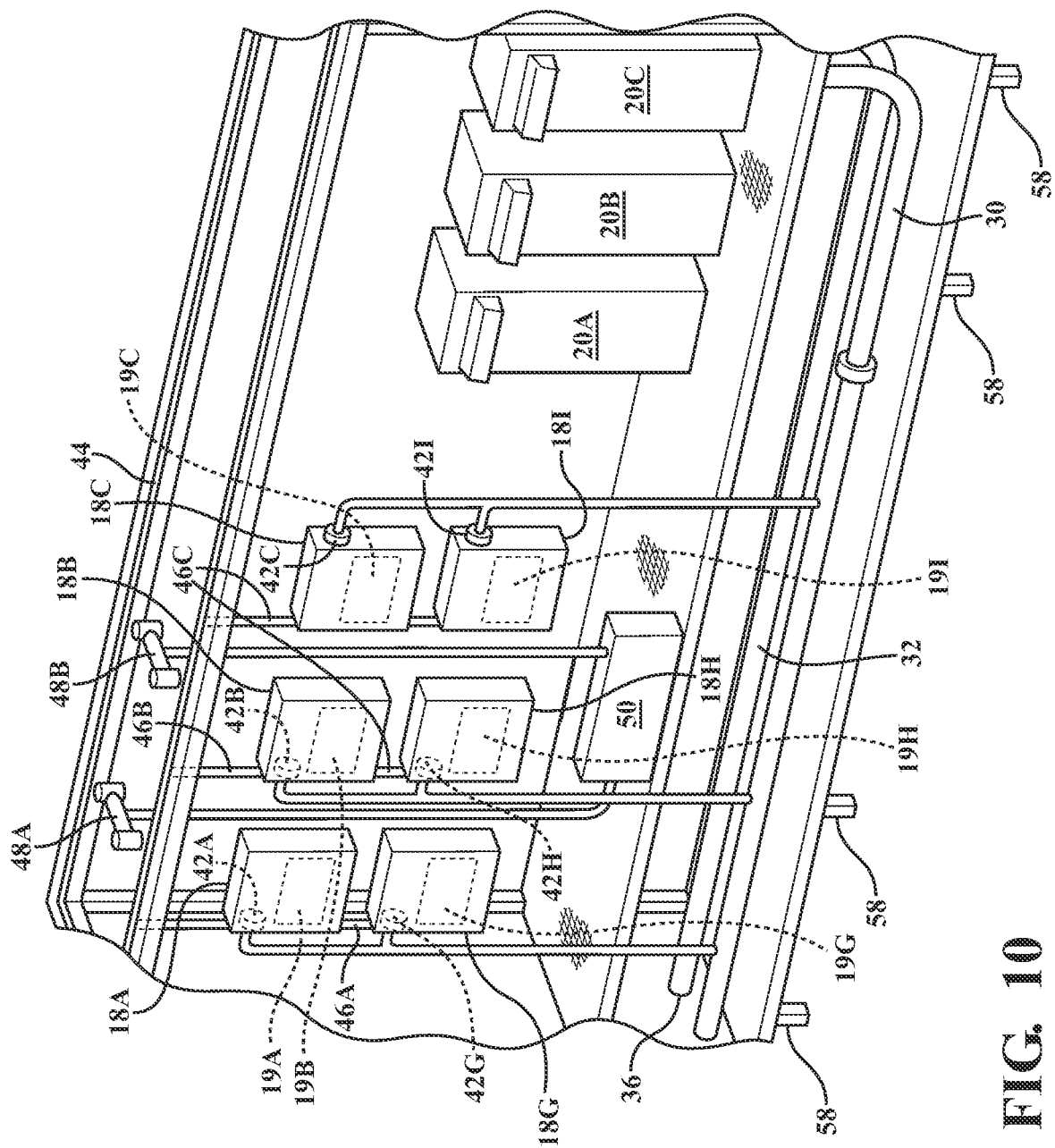
FIG. 10 illustrates a simplified view of a portion of the container of FIG. 1.

The fuel cell holders 18A-18X are each configured to hold a fuel cell (not pictured). A simplified version of the container 10 having fuel cells is shown in FIG. 10 and will be described later in this specification. The container 10 can include any suitable number of fuel cell holders 18A-18X and fuel cells. For example, as shown, the container 10 can include twenty-four fuel cell holders and twenty-four fuel cells.

The fuel cells can be grouped into fuel cell units. For example, each fuel cell unit can include four fuel cells connected in parallel. In this example, because there are twenty-four fuel cells, if each fuel cell unit includes four fuel cells, this would result in six fuel cell units. Of course, other types of arrangements regarding the number of fuel cells that form a fuel cell unit can also be contemplated. The DC-DC converters 20A-20F can each be connected to a fuel cell unit. Accordingly, the container 10 can include six DC-DC converters, for example. The DC-DC converters 20A-20F are electrically connected to the fuel cell units and are configured to regulate the output power and voltage of each fuel cell unit. The plurality of fuel cell holders 18A-18X and the plurality of DC-DC converters 20A-20F can be supported by the raised floor 22. The raised floor 22 can be formed from metal or fiberglass. In this example, the raised floor 22 is a metal grating.

Figure 4:
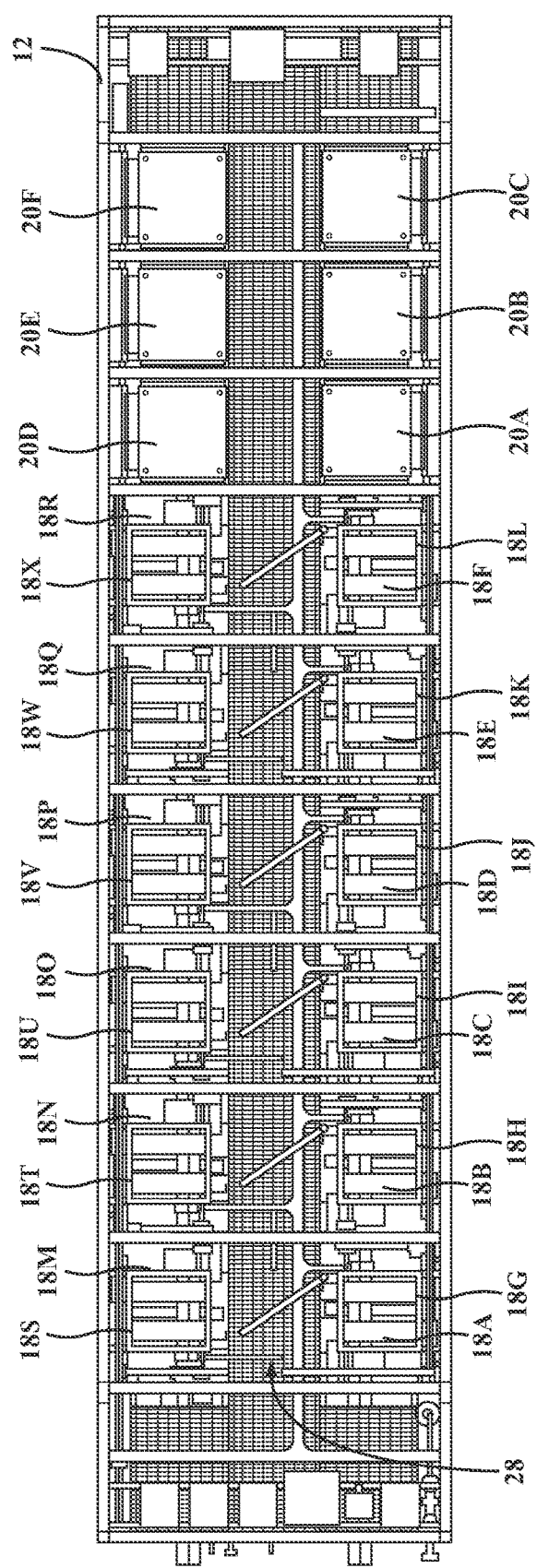
FIG. 4 illustrates a top view of the container.

Referring now to FIG. 4, which illustrates a top view of the container 10, the fuel cell holders 18A-18X can be arranged in two rows of twelve fuel cell holders within the container 10. FIG. 4 shows fuel cell holders 18A-18F (with fuel cell holders 18G-18L being below fuel cell holders 18A-18F) and fuel cell holders 18M-18R (with fuel cell holders 18S-18X being below fuel cell holders 18M-18R). For example, a first row can be made up of fuel cell holders 18A-18F (with fuel cell holders 18G-18L being below fuel cell holders 18A-18F), while a second row can be made up of fuel cell holders 18M-18R (with fuel cell holders 18S-18X being below fuel cell holders 18M-18R). Similar to the fuel cell holders 18A-18X, the DC-DC converters 20A-20F can be arranged in two rows, for example, two rows of three DC-DC converters, wherein the DC-DC converters 20A-20C form a first row, and the DC-DC converters 20D-20F form a second row.

Between the first row of fuel cell holders 18A-18F and/or the DC-DC converters and the second row of fuel cell holders 18M-18R and/or the DC-DC converters 20D- the container 10 can include a central aisle 28. The central aisle 28 can be configured to allow interior access to the fuel cell holders 18A-18X, the fuel cells, the DC-DC converters 20A-20F, and/or other components within the container 10, for example, for performing maintenance on these components. The central aisle 28 can be sized and shaped such that a maintenance worker can enter the container 10 and access its components. The raised floor 22 provides the floor for the central aisle 28 so that a maintenance worker or any other person can walk across the raised floor 22 through the container 10.

Figure 5:
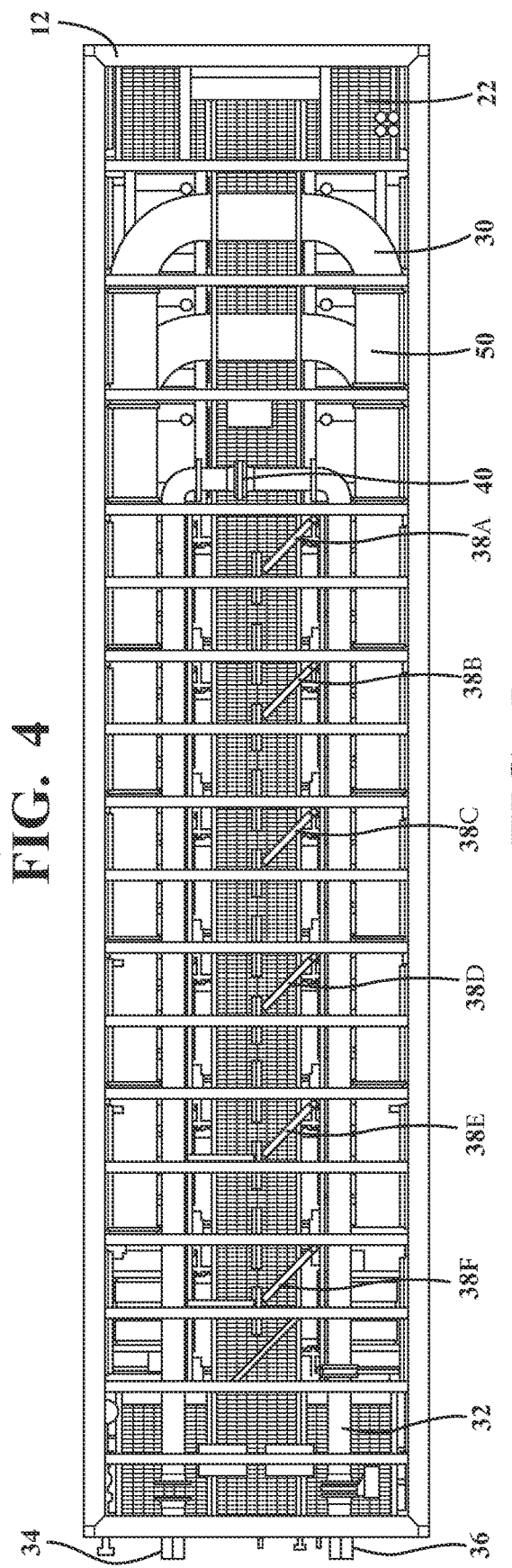
FIG. 5 illustrates a bottom view of the container.

Referring now to FIG. 5, which illustrates a bottom view of the container 10, some of the components of the container 10 can be located underneath the raised floor 22, essentially between the raised floor 22 and a support surface, such as the ground. For example, the container 10 can include one or more cable tray(s) 30 located underneath the raised floor 22. The cable tray(s) 30 can be configured to support and direct one or more cables that run through the container 10 to electrically connect one or more components of the container 10, for example, the fuel cells, the DC-DC converters 20A-F, the auxiliary load center(s) 24, etc.

The container 10 can also include a cooling system. The cooling system can be configured to deliver cooling fluid through the container 10 to the plurality of fuel cells. One or more components of the cooling system can be located underneath the raised floor 22. For example, the cooling system can include a central cooling pipe 32 located underneath the raised floor 22. The central cooling pipe 32 includes a cooling fluid inlet 34 and a cooling fluid outlet 36. Cooling fluid, for example, cold water, flows into the container 10 via the cooling fluid inlet 34, and as the fuel cells are cooled, the cooling fluid heats up and then exits the container 10, for example, as hot water via the cooling fluid outlet 36.

The cooling system also includes a plurality of fuel cell cooling pipes 38A-38F and a cooling pipe valve 40. Each fuel cell cooling pipe 38A-38F is connected to the central cooling pipe 32 and a fuel cell. Accordingly, each fuel cell cooling pipe 38A-38F is configured to direct cooling fluid upwards through the container 10. The cooling pipe valve 40 is located along the central cooling pipe 32. As cooling fluid enters the central cooling pipe 32, the cooling pipe valve 40 is initially closed. This causes pressure to build in the cooling system, which directs the cooling fluid up to the fuel cells to cool the fuel cells.

Figure 6:
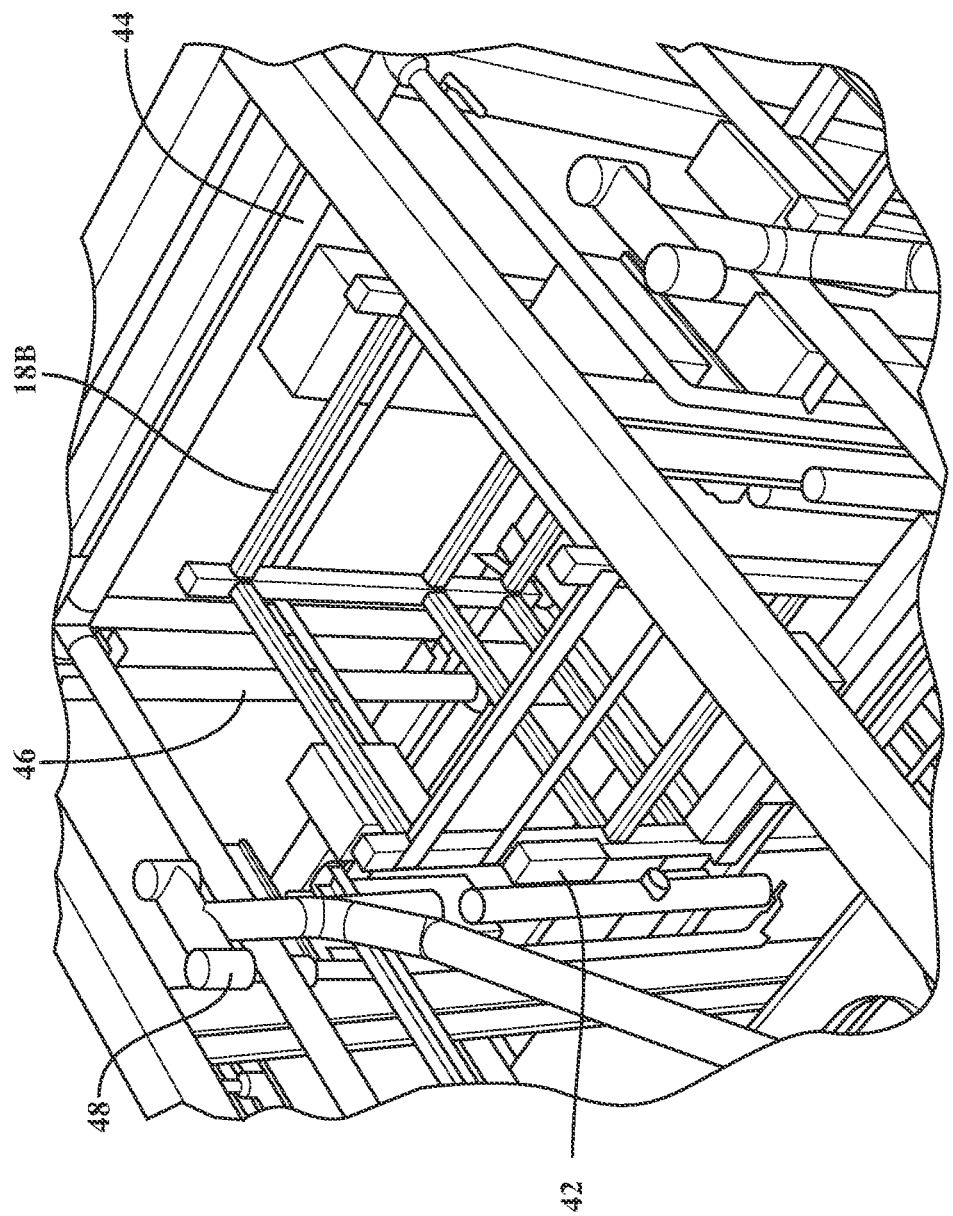
FIG. 6 illustrates a close-up view of a fuel cell holder located within the container.

FIG. 6 illustrates a close-up view of the fuel cell holder 18B located within the container 10. Because the fuel cell holders 18A-18X are substantially similar to each other, a description regarding the fuel cell holder 18B and related components is equally applicable to any of the other fuel cell holders 18A-18X. Here, a fuel cell located within fuel cell holder 18B includes a heat exchanger 42 to receive the cooling fluid and cool the fuel cell. The heat exchanger 42 can be a liquid-to-liquid heat exchanger, and the fuel cell cooling pipe 38B is configured to deliver the cooling fluid to the heat exchanger 42. After the fuel cell located within fuel cell holder 18B is cooled, the cooling pipe valve 40 is opened to release the pressure and allow the cooling fluid to exit the container 10 via the cooling fluid outlet 36. Again, it should be understood that the description regarding the fuel cell holder 18B and related components is equally applicable to other fuel cells located within other fuel cell holders.

To power the fuel cells, the container 10 includes a hydrogen supply system. The hydrogen supply system is configured to deliver hydrogen fuel (e.g., hydrogen gas) to each fuel cell. With continued reference to FIG. 6, the hydrogen supply system includes a hydrogen header pipe 44. The hydrogen header pipe 44 forms a loop around the upper perimeter of the container around the fuel cells. The loop configuration of the hydrogen header pipe 44 equalizes the pressure of the hydrogen gas within the hydrogen header pipe 44. The hydrogen header pipe 44 feeds a plurality of fuel cell hydrogen pipes connected to each fuel cell. In this example, the hydrogen header pipe 44 feeds the fuel cell hydrogen pipe 46, which is connected to the fuel cell located within the fuel cell holder 18B.

As the fuel cell system operates, it may produce exhaust in various forms. For example, it may exhaust air, water, and hydrogen (e.g., condensate). Accordingly, in conjunction with the cooling system, the container 10 includes a condensate collection system and a ventilation system to cool the various components of the container 10, to eliminate combustible build-ups of hydrogen, and remove vapor and condensation from the container 10 that may have formed during the cooling process.

With continued reference to FIG. 6, the condensate collection system includes condensate collection pipes 48 configured to collect condensate within the container 10 (e.g., liquid water) and direct it towards the bottom of the container 10. At the bottom of the container for example, underneath the raised floor 22, the container 10 can include a condensate collection tank 50 (FIG. 5). The condensate collected by the condensate collection pipes 48 can travel to the condensate collection tank 50 and be expelled from the container 10 by a condensate pump connected to the condensate collection tank 50.

With reference to FIGS. 7-9, the ventilation system includes vents 52A-52J located on the exterior of the container 10 along the bottom of the container 10. The vents 52A-52J can be any suitable type of vent. For example, the one or more of the vents 52A-52J can be combination damper/louver-type vents. The combination damper/louver-type vents can be opened and closed using one or more actuators (not shown) inside the container 10.

Additionally or alternatively, the vents 52A-52J and/or the container 10 can include ventilation fans 56A-56I that can work in conjunction with the container 10 itself to vent exhaust from the container. For example, the container 10 can include a sloped roof 54 (FIG. 7) so that air, hydrogen gas, and other exhaust can collect at the highest point within the container—more specifically, within the housing 14. Additionally, the ventilation system includes ventilation fans 56A-56H at either end of the container 10 near the sloped roof 54. The ventilation fans 56A-56H are configured to expel from the container 10 the exhaust collected underneath the sloped roof 54.

With continued reference to FIGS. 8 and 9, the container 10 can also include one or more power output conduits 58. The power output conduits 58 can be configured to house one or more electronics cables that connect the components of the container 10 to the external unit to provide power generated by the fuel cells to the external unit. The power output conduits 58, as shown, may exit the container 10 through the bottom of the container 10.

As mentioned above, the container 10 includes auxiliary load center(s) 24 for housing one or more components configured to provide power to the auxiliary systems/components of the container. The auxiliary systems/components can include a programmable logic controller (PLC), the condensate collection system, the ventilation system, lighting systems, and any other auxiliary system/component not described herein. Referring back to FIG. 1, the auxiliary load center(s) 24 can house one or more power panels, one or more battery units, and/or one or more uninterruptable power supplies (UPSs), among other components, that are configured to provide power to the auxiliary systems/components of the container 10.

Referring back to FIG. 2, the housing 14 can include one or more components configured to provide access to the components of the container 10, including the fuel cells, the DC-DC converters 20A-20F, the cooling system, the hydrogen supply system, the condensate collection system, the ventilation system, and the auxiliary load center(s) 24. For example, the housing 14 can include a plurality of doors 60A-60G to provide access to the interior of the container 10, including the central aisle 28. The doors 60A-60G may be aligned with the fuel cells and/or the DC-DC converters 20A-20F to provide direct access to these components. Additionally, the housing 14 can include vents 62A-62J that may correspond to the vents 52A-52J and/or the ventilation fans 56A-56I of the container 10 and that are configured to vent exhaust from the container 10.

Referring now to FIG. 10, to improve the understanding of the container 10, a simplified diagram of a portion of the container 10 is shown. Additionally, it should be understood that the simplified diagram of the portion of the container 10 is not necessarily drawn to scale but, again, is to improve the understanding of the container 10 Like before, the container includes a system frame 12 configured to support one or more components of a fuel cell system, including a plurality of fuel cell holders 18A-18C and 18G-18I, each configured to hold fuel cells 19A-19C and 19G-19I, respectively, and a plurality of DC-DC converters 20A-20C.

As explained previously, the container 10 includes a raised floor 22 configured to support the fuel cell holders 18A-18C and 18G-18I and the DC-DC converters 20A-20C. Underneath the raised floor 22, the container 10 can include a cable tray(s) 30 configured to support and direct one or more cables connecting the various components within the container as well as a central cooling pipe 32. The central cooling pipe 32 is connected to fuel cell cooling pipes 38A-38F configured to deliver cooling fluid to the heat exchangers 42A-42C and 42G-42I connected to the fuel cells. The container 10 includes a hydrogen header pipe 44 connected to fuel cell hydrogen pipes 46A-46C configured to deliver hydrogen fuel to the fuel cells 19A-19C and 19G-19I. The container 10 includes a condensate collection system, including condensate collection pipes 48A and 48B that collect and deliver condensate to a condensate collection tank 50. The container 10 also includes a ventilation system including vents 52A, a sloped roof 54, and ventilation fans 56A-56B.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"PLC," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. A PLC may include a microprocessor controlled by an algorithm, a discrete logic (e.g., ASIC), an analog circuit, a digital circuit, a programmed logic device, a memory device including instructions that, when executed, perform an algorithm so on. In one or more embodiments, a PLC may include one or more CMOS gates, combinations of gates, or other circuit components. Where multiple PLCs are described, one or more embodiments may include incorporating the multiple modules into one physical module component. Similarly, where a single module is described, one or more embodiments distribute the single module between multiple physical components.

In one or more arrangements, one or more of the PLCs described herein can include artificial or computational intelligence elements, e.g., neural network, fuzzy logic, or other machine learning algorithms. Further, in one or more arrangements, one or more of the modules can be distributed among a plurality of the modules described herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. For example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A container for a fuel cell system, comprising:
   a system frame configured to house one or more components of a fuel cell system;
   a plurality of fuel cells supported by the system frame and configured to provide power to an external unit;
   a raised floor configured to support the plurality of fuel cells; and
   a cooling system including a central cooling pipe located underneath the raised floor, a plurality of fuel cell cooling pipes connected to the central cooling pipe and to each fuel cell, and a cooling pipe valve configured to regulate the pressure of the cooling system.

2. The container of claim 1, a ventilation system including one or more ventilation fans configured to expel vapor from the container.

3. The container of claim 2, wherein the ventilation system further includes one or more vents located on the exterior of the container underneath the raised floor.

4. The container of claim 1, further comprising a central aisle configured to allow interior access to the container for maintenance on the components of the fuel cell system, wherein the raised floor provides the floor for the central aisle, the central aisle being defined by a first set of the plurality of fuel cells forming a first row and a second set of the plurality of fuel cells forming a second row.

5. The container of claim 1, further comprising:
   a housing configured to enclose the fuel cell system and protect the components of the fuel cell system from its external environment; and
   a housing frame configured to connect the housing to the system frame.

6. The container of claim 1, further comprising:
   a cable tray located underneath the raised floor and configured to support and direct one or more cables that run throughout the container.

7. The container of claim 1, wherein each fuel cell is connected to a liquid- to-liquid heat exchanger, and wherein each liquid-to-liquid heat exchanger is connected to the fuel cell cooling pipes, whereby the liquid-to-liquid heat exchangers are configured to cool the fuel cells.

8. The container of claim 1, further comprising:
   a condensate collection system including a condensate collection tank having a condensate pump, and a condensate pipe system, wherein the condensate pipe system is configured to collect liquid within the container and direct it to the condensate collection tank, and wherein the condensate pump is configured to pump the liquid from the housing into the external environment.

9. The container of claim 1, further comprising:
   a hydrogen supply system configured to deliver hydrogen fuel to each fuel cell, wherein the hydrogen supply system includes a hydrogen header pipe configured to receive a supply of hydrogen fuel and connected to a plurality of fuel cell hydrogen pipes each connected to each fuel cell.

10. The container of claim 1, further comprising:
    one or more power output conduits configured to house one or more electronics cables that connect the fuel cell system to the external unit to deliver power to the external unit.

11. A container for a fuel cell system, comprising:
    a system frame configured to house one or more components of the fuel cell system;
    a plurality of fuel cells supported by the system frame and configured to provide power to an external unit;
    a raised floor configured to support the plurality of fuel cells;
    a central aisle configured to allow interior access to the container for maintenance on the components of the fuel cell system, wherein the raised floor provides the floor for the central aisle, the central aisle being defined by a first set of the plurality of fuel cells forming a first row and a second set of the plurality of fuel cells forming a second row;
    a cooling system including a central cooling pipe located underneath the raised floor, a plurality of fuel cell cooling pipes connected to the central cooling pipe and to each fuel cell, and a cooling pipe valve configured to regulate the pressure of the cooling system;
    a ventilation system including one or more ventilation fans and one or more vents located on the exterior of the container and configured to expel vapor from the container; and
    a hydrogen supply system configured to deliver hydrogen fuel to each fuel cell, wherein the hydrogen supply system includes a hydrogen header pipe configured to receive a supply of hydrogen fuel and connected to a plurality of fuel cell hydrogen pipes each connected to each fuel cell.

12. The container of claim 11, wherein the external unit is a residential or commercial building.

13. The container of claim 11, further comprising:
    a housing configured to enclose the fuel cell system and protect the components of the fuel cell system from its external environment; and
    a housing frame configured to connect the housing to the system frame.

14. The container of claim 11, further comprising:
a cable tray located underneath the raised floor and configured to support and direct one or more cables that run throughout the container.

15. The container of claim 11, wherein each fuel cell is connected to a liquid-to-liquid heat exchanger, and wherein each liquid-to-liquid heat exchanger is connected to the fuel cell cooling pipes, whereby the liquid-to-liquid heat exchangers are configured to cool the fuel cells.

16. The container of claim 11, further comprising:
a condensate collection system including a condensate collection tank having a condensate pump, and a condensate pipe system, wherein the condensate pipe system is configured to collect liquid within the container and direct it to the condensate collection tank, and wherein the condensate pump is configured to pump the liquid from the housing into the external environment.

17. The container of claim 11, further comprising:
one or more power output conduits configured to house one or more electronics cables that connect the fuel cell system to the external unit to deliver power to the external unit.

18. The container of claim 11, wherein the ventilation fans are located near the top of the system frame, and wherein the vents are located near the bottom of the system frame underneath the raised floor.

19. A container for a fuel cell system, comprising:
a system frame configured to house one or more components of the fuel cell system;
a raised floor configured to support a plurality of fuel cells;
a central cooling pipe located underneath the raised floor;
a plurality of fuel cell cooling pipes connected to the central cooling pipe and configured for connection to each of the plurality of fuel cells;
a housing configured to enclose the fuel cell system and protect the components of the fuel cell system from its external environment; and
a housing frame configured to connect the housing to the system frame.

20. The container of claim 19, further comprising:
a central aisle;
a plurality of doors formed in the housing for exterior access to the fuel cells; and one or more vents configured to vent exhaust from the fuel cell system.

\* \* \* \* \*